(12) United States Patent
Kitagawa et al.

(10) Patent No.: US 6,223,007 B1
(45) Date of Patent: Apr. 24, 2001

(54) IMAGE FORMING APPARATUS

(75) Inventors: Takashi Kitagawa, Yamatokoriyama; Toshihiro Ohta, Nara; Yasutaka Maeda, Kyoto; Makoto Uehara; Katsuhiro Nagayama, both of Nara, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/560,679

(22) Filed: Apr. 27, 2000

(30) Foreign Application Priority Data

Apr. 28, 1999 (JP) ................................. P11-122624

(51) Int. Cl.[7] ................ G03G 15/00; G03G 15/01; H04N 1/40
(52) U.S. Cl. ............................... 399/49; 358/428; 358/525
(58) Field of Search ...................... 399/49, 72; 358/504, 358/525, 406, 428, 296, 500

(56) References Cited

U.S. PATENT DOCUMENTS 6,078,401 * 6/2000 Kanamori ..................... 358/500 X

FOREIGN PATENT DOCUMENTS 8-137239 * 5/1996 (JP) .
8-289148 11/1996 (JP) .
8-289153 11/1996 (JP) .
8-340448 12/1996 (JP) .

* cited by examiner

Primary Examiner—Sophia S. Chen
(74) Attorney, Agent, or Firm—Dike, Bronstein, Roberts & Cushman, LLP; David G. Conlin

(57) ABSTRACT

An object of the present invention is to obtain, in an accurate and stable manner, an image density at a tone rise point in a low-density region in order to form a stable image. At the time of execution of an image density correction in an image forming apparatus which employs an electrophotographic process, a toner pattern of a plurality of toner patches is formed on the basis of a reference density correction table which specifies an image density output value used for correction of an image density input value, the density of the toner patches is detected by a density detecting sensor, points corresponding to a plurality of image densities in a low-density region, detected above a predetermined level of sensitivity of the sensor, are plotted thereby to find a linear interpolation formula, an image density in the low-density region below the predetermined level of sensitivity of the density detecting sensor is interpolated with the linear interpolation formula, a comparison between the reference density correction table and a result of the interpolation is made so as to correct the image density output value, and a correction table as a post-modification correction table is prepared. An actual image is prepared using the correction table.

6 Claims, 7 Drawing Sheets

IMAGE DENSITY OUTPUT CORRECTION TABLE

LOW-DENSITY REGION DATA INTERPOLATION DESCRIPTION DIAGRAM

IMAGE FORMING APPARATUS

BACKGROUND OF THE INVENTION

1. Field of the Invention

The present invention relates to an image forming apparatus employing an electrophotographic process, such as photocopying machines, laser beam printers, facsimile apparatuses.

2. Description of the Related Art

Generally, a typical image forming apparatus employing an electrophotographic process includes a rotatably-supported photoconductive drum 1 as shown in FIG. 2. The photoconductive drum 1 is driven by drive means (not shown) to rotate in a direction S1. Around the periphery of the photoconductive drum 1 are disposed a charging device 2, an exposing device 3, a developing device 4, a transferring device 5, and a cleaning device 6 in sequential order from upstream of the rotational direction S1. A surface of the photoconductive drum 1 charged in a uniform manner by the charging device 2 is exposed to laser light by the exposing device 3, thereby to form an electrostatic latent image. The electrostatic latent image is developed with toner by the developing device 4 to become a toner image. Then, the toner image is transferred onto a transfer material by the transferring device 5. After the transfer process, the cleaning device 6 is disposed to remove residual toner present on the photoconductive drum 1.

As shown in FIG. 2, the color image forming apparatus comprises serially-arranged four units each comprising the photoconductive drum 1, the charging device 2, the exposing device 3, the developing device 4, the transferring device 5, and the cleaning device 6, so that images of Y (yellow), M (magenta), C (cyan), and BK (black) are individually formed. The developing devices 4 of these four units have developer tanks for holding therein toner of Y, toner of M, toner of C, and toner of BK, respectively.

A transfer belt 7 forming the transferring device 5 of each unit is common to the four units. The transfer belt 7 composed of denatured polyimide or the like material is constructed such that it is stretched between a pulley 17 on the drive side and a pulley 18 on the driven side in order to be able to travel in a direction S2, and transfer material such as a sheet of paper is electrostatically adsorbed to the transfer belt 7 and held there. Inside the transfer belt 7 are disposed transfer chargers 8 for transferring a toner image formed on the photoconductive drum 1 to the transfer material, to face their corresponding photoconductive drums 1, respectively. Moreover, a cleaning member for cleaning toner accumulated on the transfer belt 7 and an electric-charge eliminating member for discharging electric charge accumulated on the transfer belt 7, which are not shown in the figure, are provided inside or outside the transfer belt 7. Toner images of Y, M, C and BK transferred onto the transfer material are fixed by a fixing device 9, whereby a color image is formed.

The density characteristics of the formed image will vary with, for example, surrounding temperature and humidity and time. In other words, under the influence of variation factors of each of image formation processes such as charging, exposing, developing, transferring and fixing, image density characteristics change. To cope with such variations and obtain a constant image density, a correction to the image density is made. The amount of correction in the image density correction is determined in such a manner that a toner pattern 15 composed of a plurality of toner patches is formed on the transfer belt 7, the densities of the toner patches are detected by a density detecting sensor 10, and detection values are compared with a predetermined reference value, whereby amounts of correction to be made are determined. Image recording apparatuses of the type in which such an image density correction is made are disclosed in, for example, Japanese Unexamined Patent Publications JP-A 8-289148 (1996), JP-A 8-289153 (1996), and JP-A 8-340448 (1996).

The image output starting point obtained by increasing the exposure width of the exposing device 3 from its minimum value, i.e., the tone rise point, varies with the surrounding environment and time, as mentioned above. Although it is essential to stably obtain an accurate tone rise point when performing a tone representation (particularly a light color tone representation), the amount of toner adhesion at a tone rise point is extremely small and the density is, therefore, considerably low. Consequently, there are some image densities in a low-density region, undetectable by the density detecting sensor 10 due to the level of sensitivity thereof. Therefore, in the case where an exposure width which was detected by the density detecting sensor is employed as the tone rise point, there occurs a disagreement in exposure width with an actual density. Moreover, there are some image densities in a high-density region that cannot be detected with high accuracy by the density detecting sensor 10 due to the level of sensitivity.

SUMMARY OF THE INVENTION

Hence, an object of the invention is to provide an image forming apparatus capable of obtaining, with high accuracy and in a stable manner, an image density of a tone rise point in a low-density region in order to form an image with a constant steady density. Moreover, another object of the invention is to provide an image forming apparatus capable of obtaining, with high accuracy and in a stable manner, an image density in from a low- to an intermediate-density region, in from a low- to a high-density region, or in a high-density region in order to form an image with a constant steady image.

The invention provides an image forming apparatus comprising:

image forming means for forming an image of an output image density value obtained by correcting an input image density value in accordance with a correction table of input image densities;

density detecting means for detecting a density of the formed image;

density interpolating means for interpolating the image density detected by the density detecting means; and density correcting means for correcting the output image density value by making a comparison between the correction table and an interpolation result of the density interpolating means;

wherein the density interpolating means comprises low-density region interpolating means for finding a linear interpolation formula by linearly interpolating a plurality of image densities in a low-density region which were detected above a predetermined level of sensitivity, to interpolate an image density in the low-density region below the predetermined level of sensitivity, with the linear interpolation formula.

According to the invention, in the case where a correction in image density is carried out, a toner pattern composed of a plurality of toner patches is formed, for example, on a transfer belt by the image forming means. The toner patch is an image having an output image density value as a result of correcting an input image density value on the basis of a correction table. The density of the toner patch formed is detected by the density detection means. The density interpolating means interpolates the image density detected. Here, the low-density region interpolating means interpolates detected image densities in the low-density region. The density correcting means makes a comparison between the correction table of input image density values and an interpolation result of the density interpolating means, thereby correcting the output image density value.

The low-density region interpolating means first finds a linear interpolation formula for linearly interpolating image densities in the low-density region, which were obtained by the density detecting means having a sufficient level of sensitivity. More specifically, the low-density region interpolating means finds a linear interpolation formula for a plurality of points in a sufficient level of sensitivity region which sequentially increase in density from a certain density point. Second, by the use of the linear interpolation formula, an image density in a region which is a low-density region out of the level of sensitivity of the density detecting means is interpolated.

As a result of such arrangement, in a low-density region which is out of the level of sensitivity of the density detecting means and the effect of degradation due to noise is serious, more accurate image densities can stably be obtained. In an image which has undergone such density correction, it is possible to maintain a constant image density.

Moreover, in the image forming apparatus of the invention it is preferable that the low-density region interpolating means calculates, as a tone rise point, an image density at the time when the level of sensitivity of the density detecting means in the linear interpolation formula is zero, and the density correcting means corrects the output image density value by making a comparison between a predetermined reference tone rise point and the tone rise point calculated by the low-density region interpolating means.

According to the invention, the low-density region interpolating means finds, in the same way as previously described, a linear interpolation formula for image densities obtained by the density detecting means having a sufficient level of sensitivity. Then, the low-density region interpolating means calculates, as a tone rise point, an image density at the time when the level of sensitivity of the density detecting means in the linear interpolation formula is zero. The density correcting means makes a comparison between a predetermined reference tone rise point and the tone rise point found by the low-density region interpolating means, thereby correcting the output image density value.

Accordingly, it becomes possible to obtain, in an accurate and stable manner, a tone rise point in the low-density region and it therefore becomes possible to perform a faithful tone representation, particularly a faithful tone representation of a light color, to an original image, whereby a high-quality image can be formed.

In the image forming apparatus of the invention, it is preferable that the low-density region interpolating means finds a curvilinear interpolation formula for curvilinearly interpolating an image density of the tone rise point and a detected image density in the low-density region, detected above the predetermined level of sensitivity.

According to the invention, the low-density region interpolating means finds, in the same way as previously described, a linear interpolation formula for an image density obtained at a sufficient level of sensitivity of the density detecting means, thereby to obtain a tone rise point. Then, the low-density region interpolating means finds a curvilinear interpolation formula for curvilinearly interpolating an image density of the tone rise point and an image density in the low-density region, detected above the predetermined level of sensitivity.

Accordingly, in the low-density region, smooth density correction is performed so as to stably obtain more accurate image densities, whereby for an image which has undergone such density correction, it is possible to maintain a constant image density.

Moreover, in the image forming apparatus of the invention, it is preferable that the density interpolating means includes intermediate-density region interpolating means for interpolating an image density of an intermediate-density region, and connection interpolating means for performing interpolation by establishing a connection between an image density in the low-density region on the linear interpolation formula and an image density of the intermediate-density region.

According to the invention, a connection between image densities in the low-density region and the intermediate-density region is established for interpolation, which therefore makes it possible to stably perform a smooth tone representation to form a high-quality image.

Further, in the image forming apparatus of the invention it is preferable that the density interpolating means comprises high-density region interpolating means for interpolating an image density in a high-density region, the high-density region interpolating means performing interpolation between a saturation image density and a maximum image density.

According to the invention, not only an image density in the low-density region or an image density of from the low-density region to the intermediate-density region, but also an image density in the high-density region is interpolated. In the high-density region, linear or curvilinear interpolation between a saturation image density, i.e., an image density below the maximum image density in the intermediate-density region, and the maximum image density is performed. The high-density region interpolating means finds an interpolation formula, such as a linear interpolation formula or a curvilinear interpolation formula, for interpolation between a density point which sequentially decreases in density at below the saturation image density and the maximum image density, in a region (which is a high-density region) of an image density obtained by the density detecting means having a sufficient level of sensitivity. The density correcting means makes a comparison between the correction table of the input image density values and an interpolation result of the density interpolating means, thereby correcting the output image density value.

As a result of such arrangement, not only in the low-density region or in from the low- to the intermediate-density region, but also in the high-density region above the saturation density in which a sufficient level of sensitivity can not be obtained from the density detecting means and the effect of degradation due to noise is serious, more accurate image densities can stably be obtained. In an image which has undergone such density correction, it is possible to maintain a constant image density.

Furthermore, the invention provides an image forming apparatus comprising:

image forming means for forming an image of an output image density value obtained by correcting an input image density value in accordance with a correction table of input image densities;

density detecting means for detecting a density of the formed image;

density interpolating means for interpolating the image density detected by the density detecting means; and density correcting means for correcting the output image density value by making a comparison between the correction table and an interpolation result of the density interpolating means;

wherein the density interpolating means comprises high-density region interpolating means for interpolating an image density in a high-density region, the high-density region interpolating means performing interpolation between a saturation image density and a maximum image density.

According to the invention, an image density in the high-density region is interpolated. In the high-density region, interpolation between a saturation image density, i.e., an image density below the highest of image densities of an intermediate-density region, and the highest image density is performed. Such interpolation is performed in linear or curvilinear manner. The high-density region interpolating means finds, in the same way as previously described, an interpolation formula and the density correcting means makes a comparison between the correction table of the input image density value and an interpolation result of the density interpolating means, thereby correcting the output image density value.

As a result of such arrangement, in the high-density region above the saturation density in which a sufficient level of sensitivity can not be obtained from the density detecting means and the effect of degradation due to noise is serious, more accurate image densities can stably be obtained. In an image which has undergone such density correction, it is possible to maintain a constant image density.

BRIEF DESCRIPTION OF THE DRAWINGS

Other and further objects, features, and advantages of the invention will be more explicit from the following detailed description taken with reference to the drawings wherein:

FIGS. 1A and 1B are graphs for the description of corrections in image density by an image forming apparatus as an embodiment of the invention, wherein FIG. 1A is a graph illustrating correction tables 21 and 24 of image density outputs and FIG. 1B is a graph illustrating a relationship between the image density output value in a low-density region and the detection value (mV) of a density detecting sensor;

DETAILED DESCRIPTION OF THE PREFERRED EMBODIMENTS

Figure 1A:
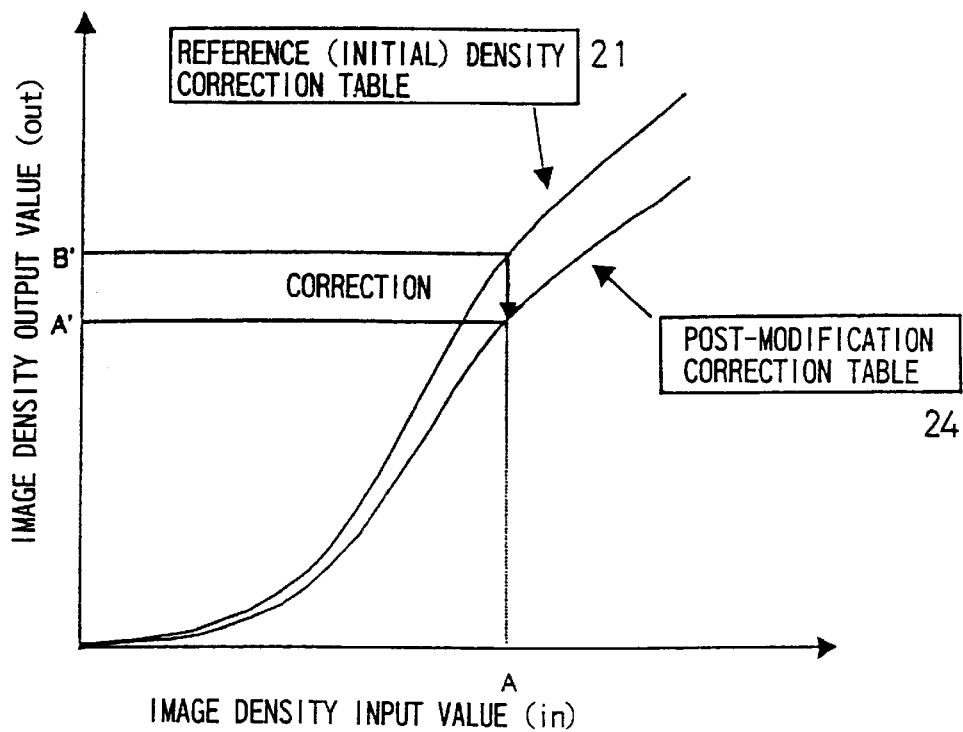

Now referring to the drawings, preferred embodiments of the invention are described below.

An image forming apparatus of the invention is an apparatus which employs an electrophotographic process which will be described later, wherein a correction to the image density varying with surrounding temperature and humidity and time is made. In the first place, the image density correction operation of an image forming apparatus of a first embodiment of the invention will be described.

At the time when a correction in image density is made, a toner pattern, which is made up of a plurality of toner patches, is first formed. The toner patches are formed on the basis of a reference (initial) density correction table 21 shown in FIG. 1A. The reference density correction table 21 is a table in which image density input values are associated with each image density out value, i.e., a table for specifying an image density output value for correction of an image density input value. The toner patches are formed by the use of an image density output value B' corresponding to an image density input value A, in other words, they are formed at a laser exposure width. Secondly, the density of the formed toner patches is detected by a density detecting sensor.

Figure 1B:
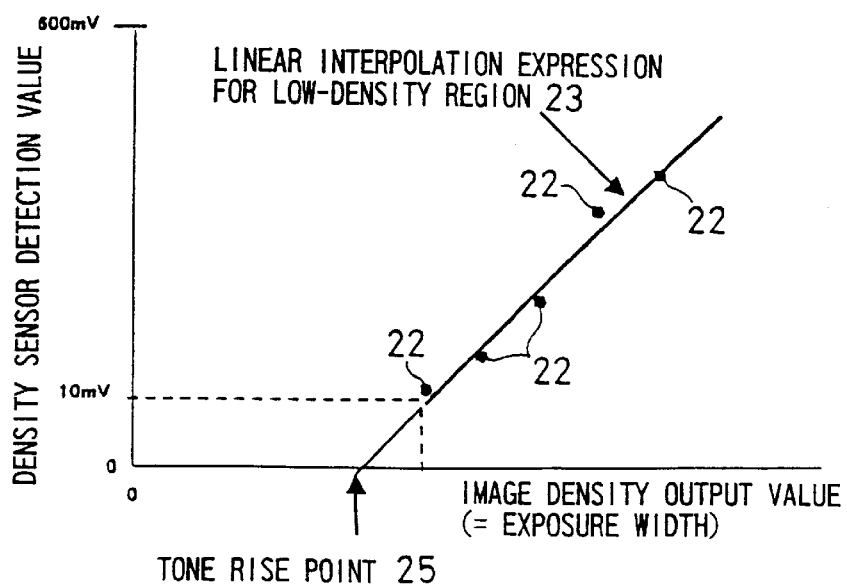

FIG. 1B is a graph illustrating a relationship between the image density output value and the detection value (mV) of a density detecting sensor. Here, the image density output value is equal to the laser exposure width. Points 22 plotted correspond to a plurality of detected image densities in a low-density region, detected above a predetermined level of sensitivity of the density detecting sensor. Considering a detection starting point in the low density region which is Density sensor detection values of a toner patch which is not so affected by density data degradation due to noise, as, for instance, a density detection sensor detection value of 10 mV, detection values of the toner patch which is formed by an exposure width of 10 mV or more are plotted. The exposure width is sequentially expanded from one value at which the density sensor detection value exceeds 10 mV up to, for example, another value at which the density sensor detection value becomes 600 mV which is a low-density region detection termination value to form therebetween five toner patches, and the density of these five toner patches is detected.

Next, a linear interpolation formula 23 for performing linear interpolation on the points 22 is found. The linear interpolation formula 23 is represented by, for example, the following formula (1).

$$\text{sensor value} = b1 \times \text{exposure width} + c1 \quad (1),$$

wherein $b1$ and $c1$ are arbitrarily-determined constant terms.

Following the above, an image density in the low-density region below the predetermined level of sensitivity of the density detecting sensor is interpolated with the linear interpolation formula 23. In other words, an exposure width, at which the density sensor detection value is less than 10 mV so that the level of sensitivity of the sensor is insufficient, is substituted in the formula (1), thereby to calculate a sensor value. In this way, the image density in the low-density region is linearly interpolated.

Finally, the reference density correction table 21 and a result of the interpolation are compared with each other to correct the image density output value B', whereby the correction table 24 as a post-modification correction table (shown in FIG. 1A) is prepared. In other words, a sensor value calculated from the formula (1) is taken as a reference sensor value y, an image density output value (an exposure width) which becomes the reference sensor value y is found, a correction amount (an exposure amount) of the image density output value is calculated, and the reference density correction table 21 is modified to prepare the correction table 24 as a post-modification correction table. An actual image is prepared using the correction table 24. For example, an image density output value corresponding to the image density input value A becomes an image density output value A' obtained by a correction of the image density output value B'.

Figure 2:
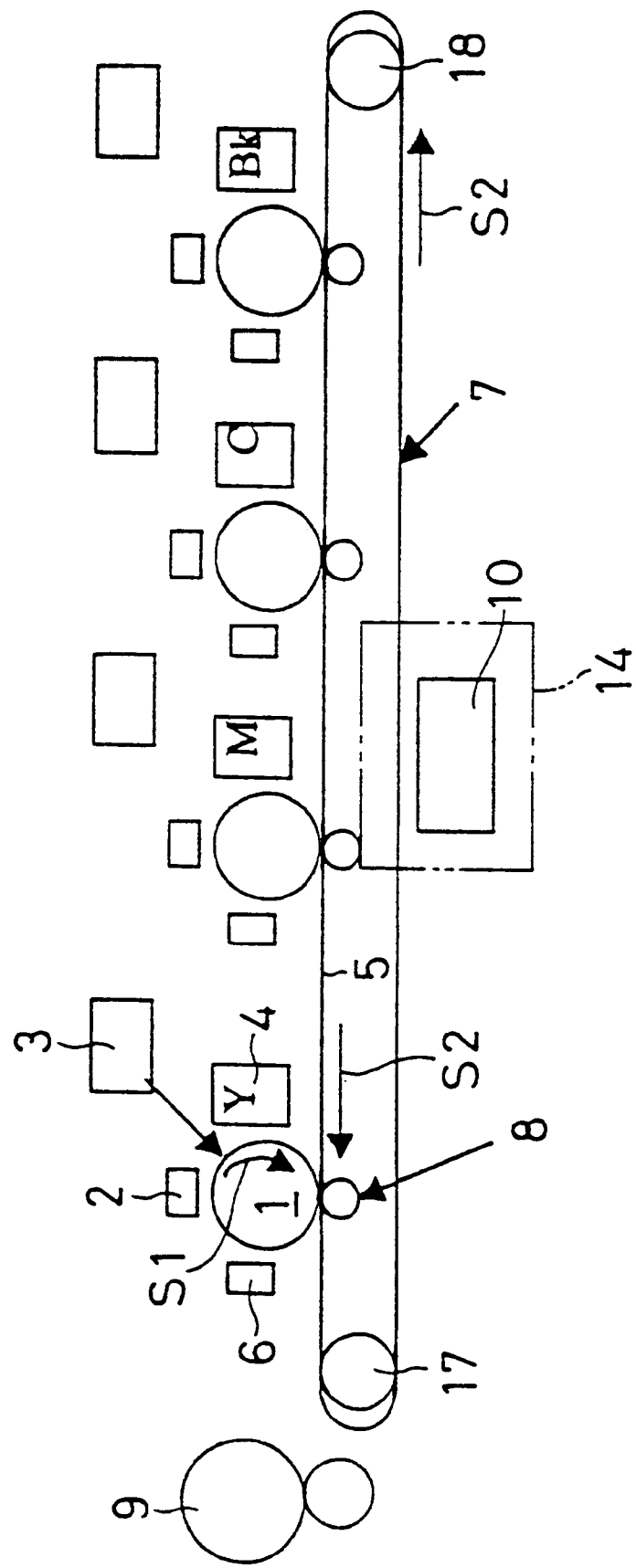
FIG. 2 is a diagram illustrating a structure of the image forming apparatus.

Referring to FIG. 2, there is illustrated a structure of the image forming apparatus. The image forming apparatus has a rotatably-supported photoconductive drum 1. The photoconductive drum 1 is driven by drive means, not shown in the figure, to rotate in a direction S1. Disposed, in sequential order from upstream of the rotational direction S1, around the periphery of the photoconductive drum 1 are a charging device 2, an exposing device 3, a developing device 4, a transferring device 5, and a cleaning device 6. A surface of the photoconductive drum 1 charged in a uniform manner by the charging device 2 is exposed to laser light by the exposing device 3, thereby to form an electrostatic latent image. The electrostatic latent image is developed with toner in the developing device 4 to become a toner image. Then, the toner image is transferred onto a transfer material by the transferring device 5. The cleaning device 6 is disposed to remove, after the transfer process, residual toner present on the photoconductive drum 1.

As shown in FIG. 2, the color image forming apparatus comprises serially-arranged four units each comprising the photoconductive drum 1, the charging device 2, the exposing device 3, the developing device 4, the transferring device 5, and the cleaning device 6, so that images of Y, M, C, and BK are individually formed. The developing devices 4 of these four units have developer tanks for holding therein toner of Y, toner of M, toner of C, and toner of BK, respectively.

A transfer belt 7 forming the transferring device 5 of each unit is common to the four units. The transfer belt 7 composed of denatured polyimide or the like material is constructed such that it is suspended, under application of tension, between a pulley 17 on the drive side and a pulley 18 on the driven side in order to be able to travel in a direction S2, and transfer material such as a sheet of paper is electrostatically adsorbed to the transfer belt 7 and held there. Disposed inside the transfer belt 7 are transfer chargers 8 for transferring a toner image formed on each photoconductive drum 1 to the transfer material, wherein the transfer chargers 8 are arranged in such a way as to face their corresponding photoconductive drums 1, respectively. Moreover, although not shown in the figure, cleaning and discharging members are provided inside or outside the transfer belt 7 for the cleaning of toner accumulated on the transfer belt 7 and for the discharging of electric charge accumulated on the transfer belt 7. Toner images of Y, M, C, and BK transferred onto the transfer material are fixed by a fixing device 9, whereby a color image is formed.

The density characteristics of an image formed will vary with, for example, surrounding temperature and humidity and time. In other words, under the influence of variation factors of each of processes of the image formation such as charging, exposing, developing, transferring, and fixing, the image density characteristics change. To cope with such variation, a correction in image density as described previously is made in order to provide a constant image density.

Figure 3:
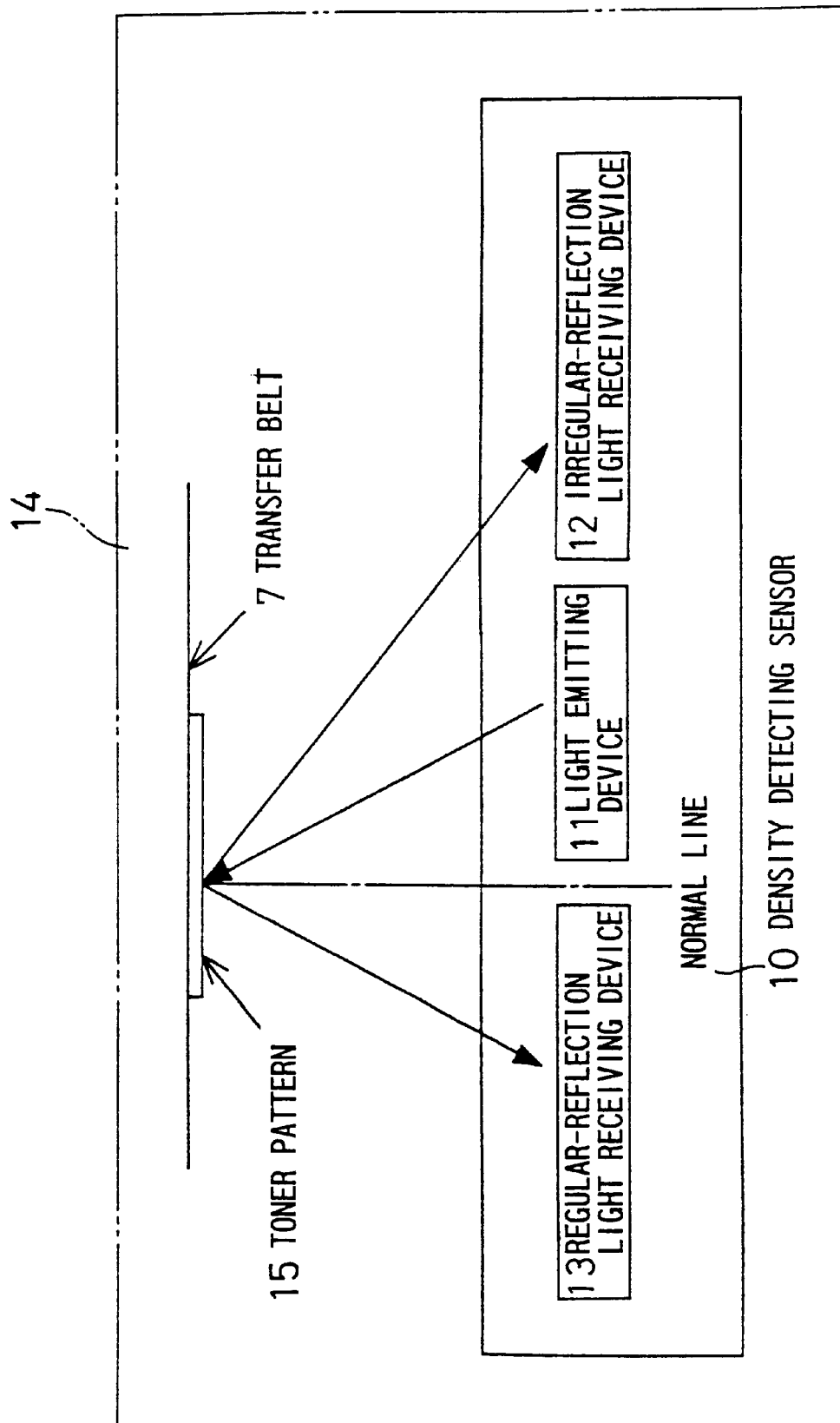
FIG. 3 is a diagram illustrating in an enlarged manner a region 14 including a transfer belt 7 and a density detecting sensor 10 of FIG. 2.

A toner patch, which is formed at the time when a correction to the image density is made, is formed, for example, on a surface of the transfer belt 7. Accordingly, the density detecting sensor 10 is disposed with its density reading surface facing the surface of the transfer belt 7. FIG. 3 illustrates an enlarged diagram of a region 14 including the transfer belt 7 and the density detecting sensor 10 of FIG. 2. The density detecting sensor 10 comprises, for example, a light emitting device 11 and a light receiving device including an irregular-reflection light receiving device 12 and a regular-reflection light receiving device 13. Rays of irradiation light from the light emitting device 11 are reflected by a toner pattern 15 on the surface of the transfer belt 7 and rays of regular-reflection light and rays of irregular-reflection light are received at the light receiving device 12 and at the light receiving device 13, respectively, thereafter being output as a density sensor detection value (mV).

Figure 4:
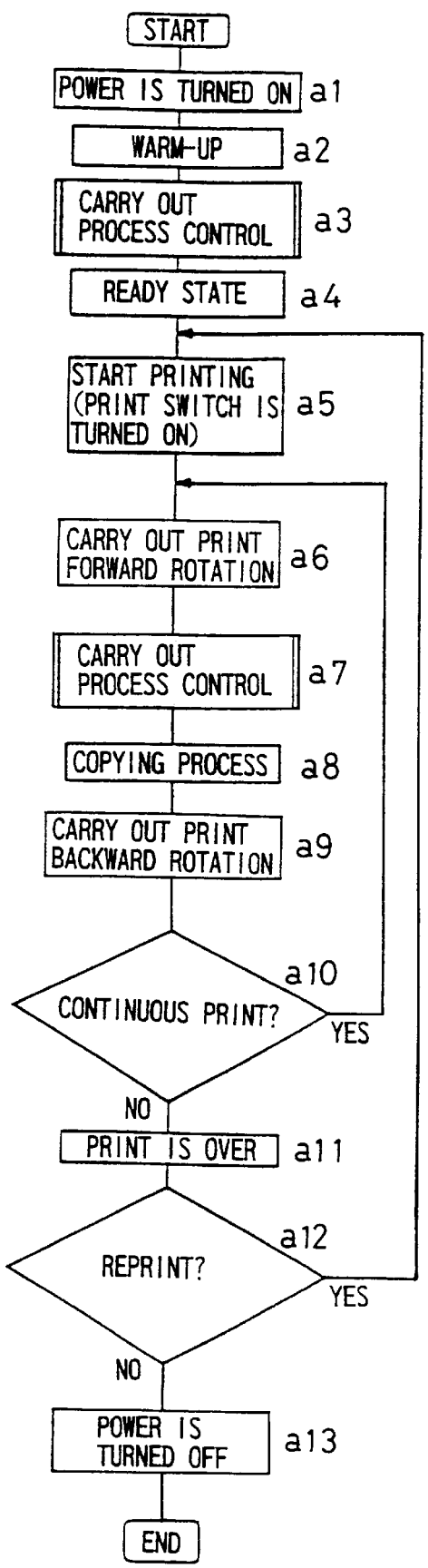
FIG. 4 is a flowchart diagram illustrating steps of the image forming operation of the image forming apparatus.

FIG. 4 is a flowchart diagram showing steps of the image forming operation of the image forming apparatus. Upon application of a power-supply voltage at step a1, the image forming operation procedure advances to step a2 to execute warm-up operations. Following the step a2, the procedure advances to step a3 to perform process control and then to step a4 to enter the ready state. Next, when a print switch of the operation panel mounted on the image forming apparatus is turned on at step a5 to start print operations, the procedure advances to step a6 at which the photoconductive drum 1 performs forward rotation. Thereafter, the procedure advances to step a7 to perform process control. Following step a7, the procedure advances to step a8 to execute a copy process and then advances to step a9 to execute print backward rotation.

In the next step, i.e., step a10, a determination of whether continuous printing is carried out is made. If so, then the procedure returns to step a6, otherwise advancing to step a11. Upon completion of the print operation at step a11, the procedure advances to step a12 to make a determination of whether printing is carried out again. If so, the procedure returns to step a5, otherwise advancing to step a13. When the power-supply voltage is turned off at step a13, the image forming operation is completed. A determination of whether continues printing is carried out or a determination of whether printing is carried out again is made, for example, through a switch operation of the operation panel mounted on the image forming apparatus.

Figure 5:
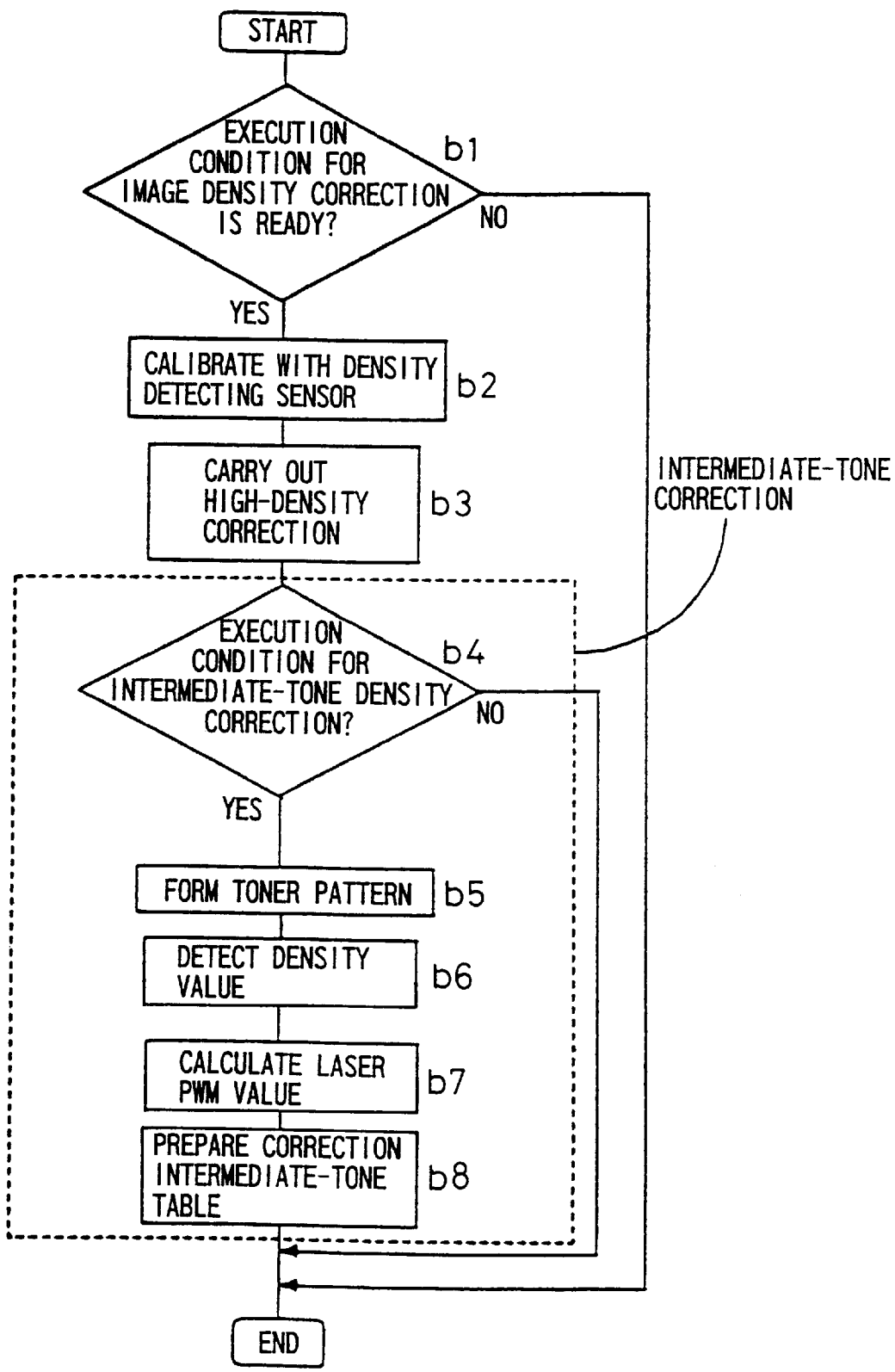
FIG. 5 is a flowchart diagram illustrating steps of the image density correcting operation of the image forming apparatus.

FIG. 5 is a flowchart diagram showing steps of the image density correcting operation of the image forming apparatus. At step b1, a determination of whether an execution condition for carrying out a correction to the image density is met is made. Such an execution condition is, for example, a difference in surrounding temperature or humidity between the time when the previous image density correction was made and the present time, or the time elapsing therebetween. If the condition is met, then the density correcting procedure moves to step b2. If not, the operation is terminated.

Density measurement is carried out by the density detecting sensor 10 at step b2, and an image density correction in a high-density region is performed at step b3. Such an image density correction is made, for example, by the controlling of charging and phenomenon bias voltage in image formation.

Following the above, an intermediate tone correction will be executed, but an image density correction of the low-density region is executed here. In other words, at the next step (step b4), a determination of whether an execution condition for an intermediate tone density correction is met is made. Such an execution condition is a difference in temperature or humidity between the time when the previous intermediate tone density correction was executed and the present time, the time elapsing therebetween, or a bias voltage variation amount by an image density correction in the high-density region. If the condition is met, the procedure advances to step b5, and if not, the operation is terminated.

At step b5, a toner pattern made up of a plurality of toner patches is formed by making use of the reference density correction table 21, and a detection of the toner patch density is carried out by the density detection sensor 10 at step b6.

Here, the linear interpolation formula 23 is found from image densities in the low-density region, detected above a predetermined level of sensitivity of the density detecting sensor 10, an image density below the predetermined level of sensitivity of the density detecting sensor 10 is interpolated with the linear interpolation formula 23, and the reference density correction table 21 is compared with a result of the interpolation. Next, the procedure advances to step b7 at which the PWM (Pulse Width Modulation) value of laser light from the exposing device 3 is calculated and a correction to the image density output value is made, and then the procedure advances to step bB for preparing the intermediate-tone correction table 24 as a post-correction table. Thereafter, the image density correction is completed.

As a result of such arrangement, in a low-density region where the level of sensitivity of the density detecting sensor 10 cannot be obtained at any sufficient level and the effect of degradation due to noise is serious, more accurate image densities can stably be obtained. For an image which has undergone such density correction, it is possible to maintain a constant image density.

Next, the image density correction operation of an image forming apparatus according to a second embodiment of the invention will be described. As described in the first embodiment, toner patches are formed, their density is detected, and the linear interpolation formula 23 is found. Thereafter, an image density output value (an exposure width) when the sensor value=0 (zero) in the linear interpolation formula 23 is taken as the tone rise point 25, a correction amount (an exposure amount) is calculated from an image density output value (an exposure width) at a predetermined, reference tone rise point and an image density output value (an exposure width) at the tone rise point 25, and the reference density correction table 21 is modified to prepare the correction table 24 as a post-modification correction table. The predetermined, reference tone rise point is determined as an image density output value (an exposure width) when the sensor value=0 in the linear interpolation formula 23 found, for example, at the initial operation time.

Accordingly, it becomes possible to obtain, in an accurate and stable manner, the tone rise point 25 in the low-density region and it therefore becomes possible to perform a faithful tone representation, particularly a faithful tone representation of a light color, on an original image, whereby a high-quality image can be formed.

Next, the image density correction of an image forming apparatus according to a third embodiment of the invention will be described. As described in the first and second embodiments, toner patches are formed, their density is detected, and the linear interpolation formula 23 is found, for obtaining the tone rise point 25. Then, a curvilinear interpolation formula is found which is used for curvilinear interpolation of an image density output value (an exposure width) at the tone rise point 25 and an image density in the low-density region, detected above a predetermined level of sensitivity (i.e., the point 22 at which the density sensor detection value exceeds 10 mV). The curvilinear interpolation formula can be represented, for example, by the following formula (2).

$$\text{sensor value} = a2 \times \text{exposure width} \times \text{exposure width} + b1 \times \text{exposure width} + c \quad (2),$$

where a2, b1, and c are arbitrarily-determined constant terms.

Following the above, an image density in the low-density region below the predetermined level of sensitivity of the density detecting sensor 10 is subjected to interpolation by the curvilinear interpolation formula. In other words, an exposure width, at which the density sensor detection value is less than 10 mV so that the level of sensitivity of the sensor is insufficient, is substituted in the formula (2), thereby to calculate a sensor value. In this way, the image density in the low-density region is curvilinearly interpolated.

Finally, the reference density correction table 21 and a result of the interpolation are compared with each other to correct the image density output value B', whereby the correction table 24 as a post-modification correction table is prepared. In other words, a sensor value calculated from the formula (2) is taken as a reference sensor value y, an image density output value (an exposure width) which becomes the reference sensor value y is found, a correction amount (an exposure amount) of the image density output value is calculated, and the reference density correction table 21 is modified to prepare the correction table 24 as a post-modification correction table.

Accordingly, according to the image forming apparatus of the third embodiment, a smooth correction of the density is carried out in the low-density region, whereby more accurate image densities can stably be obtained. For an image which has undergone such density correction, it is possible to maintain a constant image density.

Figure 6:
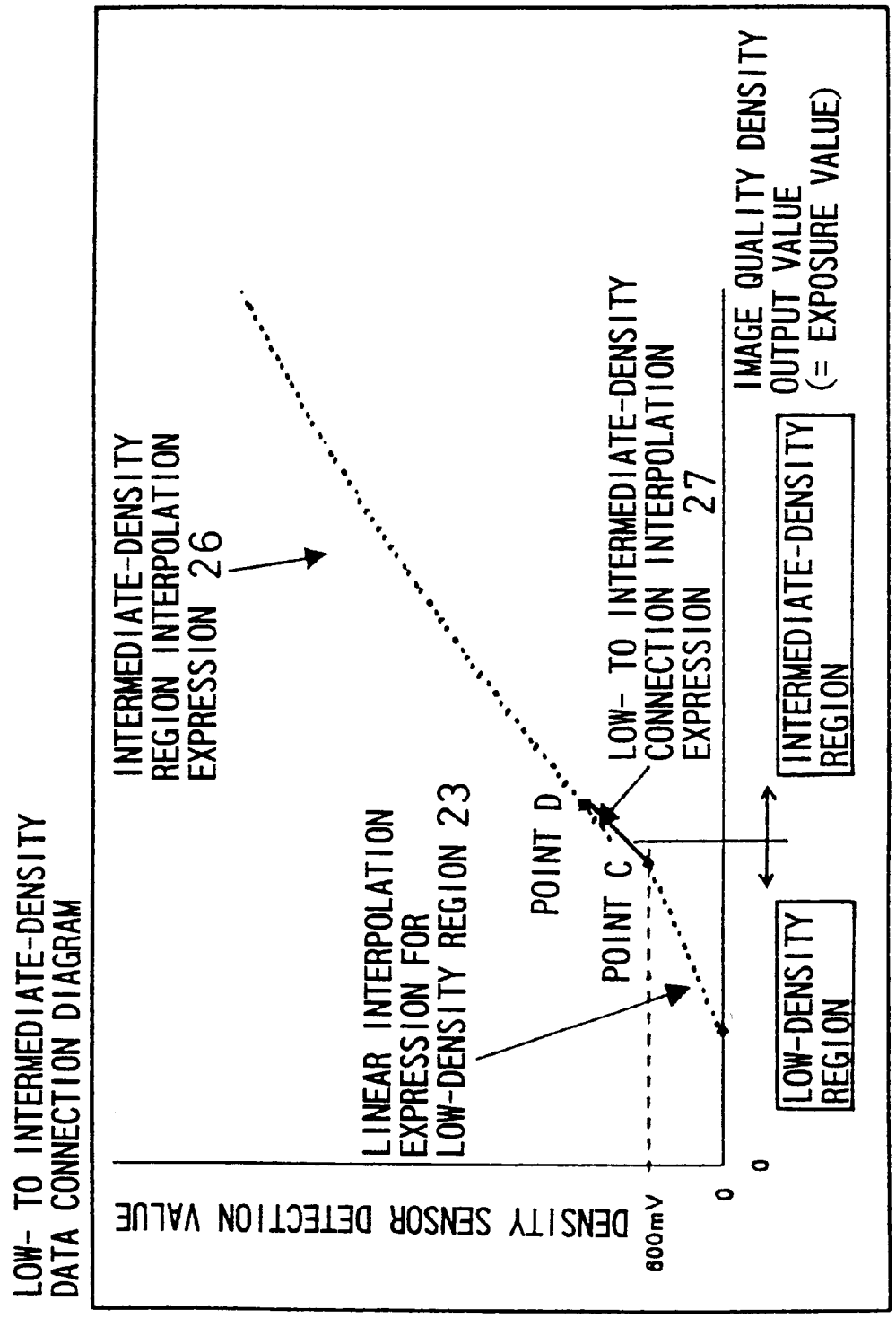
FIG. 6 is a graph illustrating a relationship between the image density output value in from a low- to an intermediate-density region and the detection value (mV) of a density detecting sensor.

Next, the image density correction operation of an image forming apparatus of a fourth embodiment of the invention will be described. The image forming apparatuses of the first to third embodiments are characterized in that they perform an image density correction for a low-density region. On the other hand, the image forming apparatus of the fourth embodiment is characterized in that it performs an image density correction for a range between the low-density region and the intermediate-density region. Referring to FIG. 6, there is graphically illustrated a relationship between the image density output value and the detection value (mV) of a density detecting sensor, and FIG. 6 is a graph particularly showing from a low- to a intermediate-density region. Image densities of the intermediate-density region are interpolated to find an interpolation formula 26. Connection between an image density point C on the linear interpolation formula 23 of the low-density region at which the density sensor detection value falls below 600 mV and another image density point D on the interpolation formula 26 of the intermediate-density region at which the density sensor detection value exceeds 600 mV, is established for, for example, linear or curvilinear interpolation, whereby a connecting interpolation formula 27 is prepared. The image density between the points C and D is compared, on the basis of the connecting interpolation formula 27, with a sensor output reference value, thereby to calculate a correction amount of the image density output value.

Accordingly, according to the image forming apparatus of the fourth embodiment, it is possible to stably perform smooth tone representation over a range from the low-density region to the intermediate-density region, whereby high-quality images can be formed. The fourth embodiment image forming apparatus is implemented by a combination with any one of the image forming apparatuses of the first to third embodiments.

Figure 7:
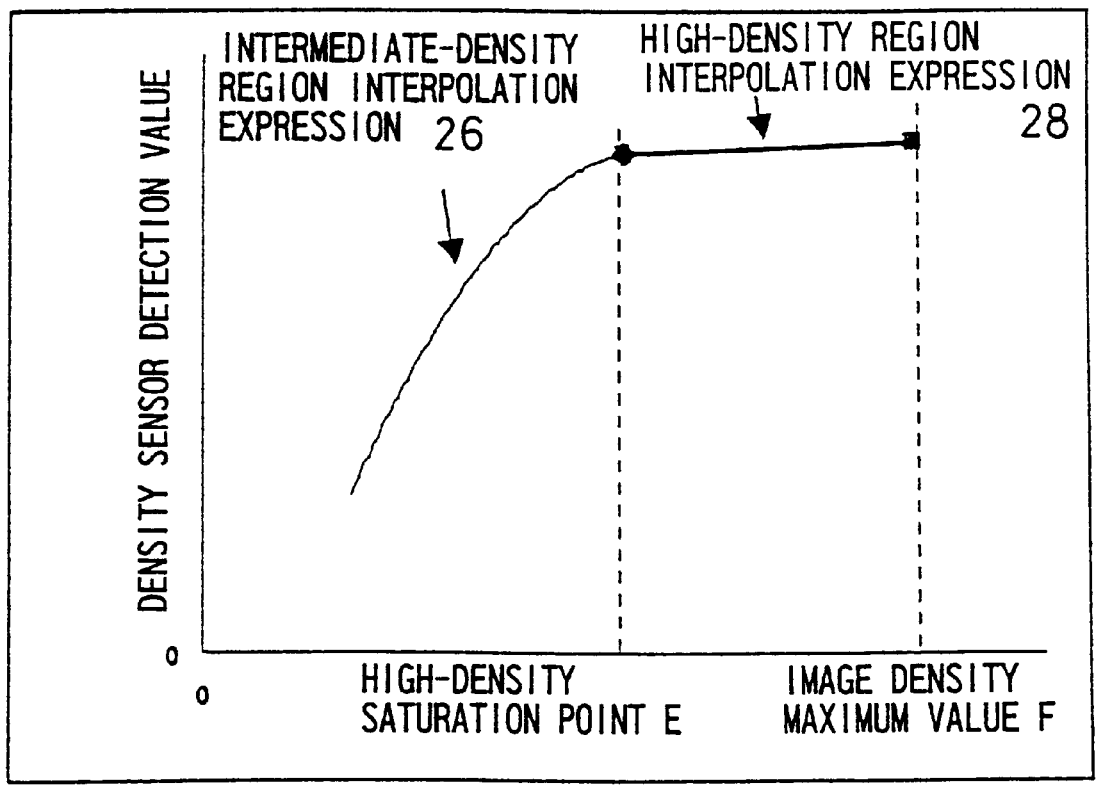
FIG. 7 is a graph illustrating a relationship between the image density output value in a high-density region and the detection value (mV) of a density detecting sensor.

Next, the image density correction operation of an image forming apparatus of a fifth embodiment of the invention will be described. The image forming apparatus of the fifth embodiment is characterized in that it performs an image density correction for a high-density region. Referring to FIG. 7, there is graphically shown a relationship between the image density output value and the detection value (mV) of a density detecting sensor, and FIG. 7 is a graph particularly showing a high-density region. Image densities of an intermediate-density region are interpolated to find the interpolation formula 26. Linear or curvilinear interpolation between an image density below the saturation image density in the high-density region, e.g., a high-density saturation point E, and an image density maximum value F which is the maximum image density, is performed to prepare an interpolation formula 28. The image density in the high-density region is compared, on the basis of the interpolation formula 28, with a reference value of the sensor output, thereby to calculate a correction amount of the image density output value.

Accordingly, according to the image forming apparatus of the fifth embodiment, in a high-density region in which a sufficient level of sensitivity can not be obtained from the density detection sensor 10 and the effect of degradation due to noise is serious, it is possible to stably obtain more accurate image densities. For an image which has undergone such density correction, it is possible to maintain a constant image density. The image forming apparatus of the fifth embodiment can be implemented independently, or it can be implemented by a combination with any one of the image forming apparatuses of the first to fourth embodiments.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image forming apparatus comprising:

image forming means for forming an image of an output image density value obtained by correcting an input image density value in accordance with a correction table of input image densities;

density detecting means for detecting a density of the formed image;

density interpolating means for interpolating the image density detected by the density detecting means; and density correcting means for correcting the output image density value by making a comparison between the correction table and an interpolation result of the density interpolating means;

wherein the density interpolating means comprises low-density region interpolating means for finding a linear interpolation formula by linearly interpolating a plurality of image densities in a low-density region which were detected above a predetermined level of sensitivity, to interpolate an image density in the low-density region below the predetermined level of sensitivity, with the linear interpolation formula.

2. The image forming apparatus of claim 1, wherein the low-density region interpolating means calculates, as a tone rise point, an image density at the time when the level of sensitivity of the density detecting means in the linear interpolation formula is zero, and the density correcting means corrects the output image density value by making a comparison between a predetermined reference tone rise point and the tone rise point calculated by the low-density region interpolating means.

3. The image forming apparatus of claim 2, wherein the low-density region interpolating means finds a curvilinear interpolation formula for curvilinearly interpolating an image density of the tone rise point and a detected image density in the low-density region, detected above the predetermined level of sensitivity.

4. The image forming apparatus of claim 1, wherein the density interpolating means includes:

intermediate-density region interpolating means for interpolating an image density of an intermediate-density region, and connection interpolating means for performing interpolation by establishing a connection between an image density in the low-density region on the linear interpolation formula and an image density of the intermediate-density region.

5. The image forming apparatus of claim 1, wherein the density interpolating means comprises high-density region interpolating means for interpolating an image density in a high-density region, the high-density region interpolating means performing interpolation between a saturation image density and a maximum image density.

6. An image forming apparatus comprising:

image forming means for forming an image of an output image density value obtained by correcting an input image density value in accordance with a correction table of input image densities;

density detecting means for detecting a density of the formed image;

density interpolating means for interpolating the image density detected by the density detecting means; and density correcting means for correcting the output image density value by making a comparison between the correction table and an interpolation result of the density interpolating means;

wherein the density interpolating means comprises high-density region interpolating means for interpolating an image density in a high-density region, the high-density region interpolating means performing interpolation between a saturation image density and a maximum image density.

* * * * *